(12) United States Patent
Li et al.

(10) Patent No.: US 10,524,005 B2
(45) Date of Patent: Dec. 31, 2019

(54) FACILITATING TELEVISION BASED INTERACTION WITH SOCIAL NETWORKING TOOLS

(71) Applicant: Intel Corporation, Santa Clara, CA (US)

(72) Inventors: Wenlong Li, Beijing (CN); Xiaofeng Tong, Beijing (CN); Yangzhou Du, Beijing (CN); Jianguo Li, Beijing (CN); Peng Wang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/670,024

(22) Filed: Aug. 7, 2017

(65) Prior Publication Data

US 2017/0347151 A1 Nov. 30, 2017

Related U.S. Application Data

(63) Continuation of application No. 13/994,761, filed as application No. PCT/CN2011/001544 on Sep. 12, 2011, now abandoned.

(51) Int. Cl.
*H04N 21/442* (2011.01)
*G06Q 50/00* (2012.01)

(52) U.S. Cl.
CPC ....... *H04N 21/44218* (2013.01); *G06Q 50/01* (2013.01)

(58) Field of Classification Search
CPC ....... H04N 21/44218; H04N 21/25883; H04N 21/4126; H04N 21/44222; H04N 21/25808; H04N 21/4223; H04N 21/437; H04N 21/44204; H04N 21/4788; H04N 21/4532; H04N 5/23206; H04N 21/251; H04N 21/44008; H04N 21/4667; H04N 21/4753; H04N 21/6582; H04N 21/43615; H04N 5/76; H04N 5/77; G06F 3/011; G06F 3/0484; G06F 3/017; H04H 60/33; H04H 60/45; G06K 9/00362; H04L 43/04; H04L 67/02; H04L 67/141

See application file for complete search history.

(56) References Cited

U.S. PATENT DOCUMENTS 5,164,992 A 11/1992 Turk
5,550,928 A 8/1996 Lu
(Continued)

FOREIGN PATENT DOCUMENTS

CN 1565126 A 1/2005
CN 1725822 A 1/2006
(Continued)

OTHER PUBLICATIONS

KR office action in corresponding divisional application No. 10-2016-7022923 dated Aug. 29, 2016 (6 pgs).
(Continued)

*Primary Examiner* — Benjamin R Bruckart
*Assistant Examiner* — Tien M Nguyen
(74) *Attorney, Agent, or Firm* — Christopher K. Gagne (57) ABSTRACT

Video analysis may be used to determine who is watching television and their level of interest in the current programming Lists of favorite programs may be derived for each of a plurality of viewers of programming on the same television receiver.

25 Claims, 2 Drawing Sheets

(56) References Cited

U.S. PATENT DOCUMENTS

| | | | |
|---|---|---|---|
| 6,701,526 | B1 | 3/2004 | Trovato |
| 8,196,168 | B1 | 6/2012 | Bryan |
| 8,667,519 | B2* | 3/2014 | Small ................ H04N 21/4223 |
| | | | 725/10 |
| 8,806,021 | B2 | 8/2014 | Larsson |
| 8,848,024 | B2 | 9/2014 | Greenfield |
| 2002/0072952 | A1 | 6/2002 | Hamzy |
| 2004/0223606 | A1 | 11/2004 | Enete |
| 2007/0092220 | A1* | 4/2007 | Tanabe ............... G06K 9/00248 |
| | | | 386/239 |
| 2007/0150916 | A1 | 6/2007 | Begole |
| 2007/0168543 | A1* | 7/2007 | Krikorian ............ G11B 27/034 |
| | | | 709/231 |
| 2008/0004951 | A1 | 1/2008 | Huang |
| 2008/0127176 | A1 | 5/2008 | Lee |
| 2009/0175509 | A1* | 7/2009 | Gonion ................ G06F 1/3231 |
| | | | 382/118 |
| 2009/0210892 | A1 | 8/2009 | Ramaswamy |
| 2009/0293079 | A1* | 11/2009 | McKee ................ G06Q 10/105 |
| | | | 725/10 |
| 2009/0326970 | A1 | 12/2009 | Estrada |
| 2010/0057546 | A1 | 3/2010 | Wang |
| 2010/0169917 | A1 | 7/2010 | Harboe |
| 2010/0241699 | A1 | 9/2010 | Muthukumarasamy |
| 2011/0153412 | A1 | 6/2011 | Novikov |
| 2011/0182484 | A1 | 7/2011 | Jeon et al. |
| 2012/0072939 | A1* | 3/2012 | Crenshaw ............. H04H 60/33 |
| | | | 725/12 |
| 2012/0233633 | A1 | 9/2012 | Nishikawa |
| 2012/0291059 | A1 | 11/2012 | Roberts |

FOREIGN PATENT DOCUMENTS

| | | |
|---|---|---|
| CN | 101286201 A | 10/2008 |
| CN | 201226568 Y | 4/2009 |
| CN | 102077238 A | 5/2011 |
| JP | 200612171 A | 1/2006 |
| JP | 2006-197001 | 7/2006 |
| JP | 2006-260275 | 9/2006 |
| JP | 2009141952 A | 6/2009 |
| JP | 2009-152745 | 7/2009 |
| JP | 2459707 A | 11/2009 |
| JP | 2010152477 A | 7/2010 |
| JP | 2011-511346 | 4/2011 |
| JP | 2011521490 A | 7/2011 |
| KR | 10-2006-0021544 | 3/2006 |
| KR | 10-1895846 | 9/2018 |
| WO | 2011041088 | 4/2011 |

OTHER PUBLICATIONS

KR office action in corresponding application No. 9-5-2015-019155126 dated Mar. 23, 2015 (5 pgs).
KR office action in corresponding divisional application No. 10-2016-7022923 dated May 23, 2016 (6 pgs).
KR office action in corresponding divisional application No. 10-2016-7022923 dated Dec. 3, 2015 (6 pgs).
JP office action in corresponding divisional application No. 2014-528817 dated Aug. 18, 2015 (4 pgs).
JP office action in corresponding divisional application No. 2014-528817 dated Mar. 10, 2015 (3 pgs).
CN office action in corresponding application No. 201280047610.6 dated May 23, 2016 (22 pgs).
CN office action in corresponding application No. 201280047610.6 dated Dec. 30, 2016 (23 pgs).
CN office action in corresponding application No. 201280047610.6 dated Jun. 13, 2017 (14 pgs).
CN search report in corresponding application No. 201280047610.6 dated Jun. 5, 2017 (2 pgs).
PCT International Search Report and Written Opinion issued in corresponding PCT/CN2011/001544 dated May 24, 2012 (11 pgs).
Extended EP Search Report issued in corresponding EP11872185.1-1958/2756473 dated Jan. 8, 2015 (6 pgs).
KR office action in corresponding divisional application No. 10-2016-7022923 dated Sep. 25, 2015 (3 pgs).
Office Action dated Sep. 9, 2013 in U.S. Appl. No. 13/994,761, and related attachments.
Office Action dated Feb. 18, 2014 in U.S. Appl. No. 13/994,761, and related attachments.
Office Action dated Apr. 25, 2014 in U.S. Appl. No. 13/994,761, and related attachments.
Office Action dated Sep. 15, 2014 in U.S. Appl. No. 13/994,761, and related attachments.
Office Action dated Dec. 15, 2014 in U.S. Appl. No. 13/994,761, and related attachments.
Office Action dated Feb. 18, 2015 in U.S. Appl. No. 13/994,761, and related attachments.
Office Action dated Apr. 6, 2015 in U.S. Appl. No. 13/994,761, and related attachments.
Office Action dated Jul. 29, 2015 in U.S. Appl. No. 13/994,761, and related attachments.
Office Action dated Oct. 8, 2015 in U.S. Appl. No. 13/994,761, and related attachments.
Office Action dated Dec. 24, 2015 in U.S. Appl. No. 13/994,761, and related attachments.
Office Action dated May 18, 2016 in U.S. Appl. No. 13/994,761, and related attachments.
Office Action dated Jul. 12, 2016 in U.S. Appl. No. 13/994,761, and related attachments.
Office Action dated Aug. 11, 2016 in U.S. Appl. No. 13/994,761, and related attachments.
Office Action dated Sep. 9, 2016 in U.S. Appl. No. 13/994,761, and related attachments.
Office Action dated Feb. 9, 2016 in U.S. Appl. No. 13/994,761, and related attachments.
Office Action dated Mar. 17, 2017 in U.S. Appl. No. 13/994,761, and related attachments.
Office Action dated May 22, 2017 in U.S. Appl. No. 13/994,761, and related attachments.
Office Action dated Oct. 11, 2017 in U.S. Appl. No. 13/994,761, and related attachments.
Office Action dated May 7, 2017 in U.S. Appl. No. 13/994,761, and related attachments.
Office Action dated Apr. 3, 2017 in EPO Application No. 11872185.1.
Office Action dated Nov. 10, 2017 in EPO Application No. 17195153.6.
Office Action dated Nov. 21, 2017 in Korean Patent Application No. 10-2017-7024236, and English translation thereof.
Grant of Patent dated May 30, 2018 in Korean Patent Application No. 10-2017-7024236, and English translation thereof.
International Search Report dated Sep. 6, 2012 in PCT Application No. PCT/CN2012/077002.
International Preliminary Report on Patentability and Written Opinion dated Mar. 12, 2014 and Sep. 6, 2012, respectively, in PCT Application No. PCT/CN2012/077002.
Notice of Final Rejection and Decision of Rejection of Amendment dated May 30, 2017 in Korean Patent Application No. 10-2016-7022923, and English translation thereof.
Office Action dated Mar. 23, 2015 in Korean Patent Application No. 10-2014-7008041, and English translation thereof.
Office Action dated Sep. 25, 2015 in Korean Patent Application No. 10-2014-7008041, and English translation thereof.
Office Action dated Dec. 3, 2015 in Korean Patent Application No. 10-2014-7008041, and English translation thereof.
Office Action dated May 23, 2016 in Korean Patent Application No. 10-2014-7008041, and English translation thereof.
Decision to Decline Amendment dated Apr. 12, 2016 in Japanese Patent Application No. 2014-528817, and English translation thereof.
Decision of Refusal dated Apr. 12, 2016 in Japanese Patent Application No. 2014-528817, and English translation thereof.
Decision to Grant a Patent dated Oct. 25, 2016 in Japanese Patent Application No. 2014-528817, and English translation thereof.

(56) References Cited

OTHER PUBLICATIONS

Korean Letters Patent Registration No. 10-1895846, registration date Aug. 31, 2018, and partial English translation.
Summons to attend oral proceedings in European Patent Application No. 11872185, dated Jul. 12, 2019, and related attachments.

* cited by examiner

FACILITATING TELEVISION BASED INTERACTION WITH SOCIAL NETWORKING TOOLS

CROSS-REFERENCE TO RELATED APPLICATIONS

This application is a continuation of U.S. patent application Ser. No. 13/994,761 filed on Jun. 17, 2013, hereby expressly incorporated by reference herein.

BACKGROUND

This relates generally to television and to interaction with social networking tools.

Social networking tools have become essential to the lives of many people. Social networking tools allow their users to keep track of their friends and to find sources of additional contacts with existing and new friends.

One advantage of social networking is that friends with similar interests can be identified. However, to determine what those interests are usually requires a lot of user input. For example, a user may maintain a Facebook page that indicates area of interest. The amount of information that may be provided may be limited because of the amount of time that it takes and the amount of imagination it may involve to provide a full exposition of all the user's interests, likes, and dislikes.

DETAILED DESCRIPTION

In accordance with some embodiments, information about a user's television experience may be automatically conveyed to social networking tools as a modality for increasing social interaction. Moreover, some embodiments may actually determine, not only whether the user is online, but also whether the user is actually proximate to the user's television display. In some embodiments, it can be determined from the user's facial expressions whether or not the user likes or dislikes the currently displayed programming. Also, in some embodiments, favorite program lists for various television viewers may be compiled in an automated fashion. This information may then be uploaded to social networking tools or to other avenues for social interaction.

Figure 1:
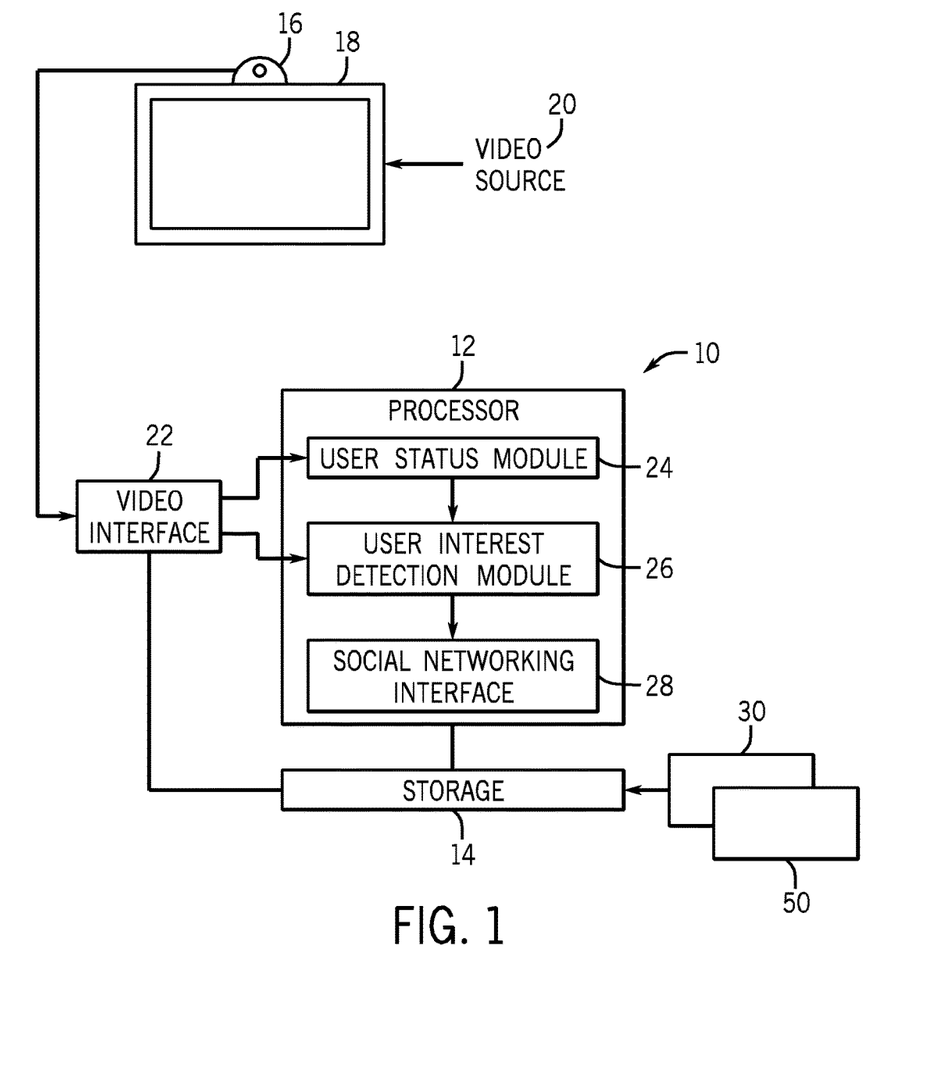
FIG. 1 is a schematic depiction of one embodiment of the present invention.

Referring to FIG. 1, a television display 18 may be equipped, in one embodiment, with a television camera 16. While, in some embodiments, the television camera may be mounted on or integrated with the television display 18, the camera, of course, can be completely separate from the television display. However, it is advantageous that the camera 16 be mounted in a way that it can capture images of those people watching the television and can also capture their facial expressions. Thus, the television 18 may receive a video source which may be an airwave broadcast, streaming Internet information, a digital movie from a storage device, such as a DVD player, an interactive game played over the Internet or using a digital media player.

The output from the camera 16 may be connected to a processor-based system 10. The processor-based system 10 may be any type of computer, including a laptop computer, a desktop computer, an entertainment device, or a cell phone, to mention a few examples. The processor-based system 10 may include a video interface 22 that receives the video from the camera 16 and converts it to the proper format for use by a processor 12. The video interface may provide the video for a user status module 24.

In accordance with one embodiment, the user status module determines whether the user is actually online and, in some embodiments, whether the user is actually watching television. The online status can be determined from detecting inputs and outputs through a network interface controller, for example. Whether the user is actually viewing the program can be determined, for example, from video analysis of the camera 16 video feed to detect whether the user is present in front of the television screen.

In some embodiments, the user status module may detect numerous television viewers. Each of those viewers may be identified by automated facial analysis. For example, in the setup mode, each viewer may be prompted to cooperate in the capture of a picture of the user. Then the system can compare the images of faces of viewers of the television program with those prerecorded video clips or still shots taken during a setup mode, to identify the currently active viewers.

Thus, user status module 24, in some embodiments, not only indicates whether or not any viewer is viewing the television but actually identifies which of a plurality of viewers are actually viewing the television display 18.

The user status module may be coupled to a user interest detection module 26 that also receives a video feed from the video interface 22. The user interest detection module 26 may analyze the user's facial expressions using video facial expression analysis tools to determine whether the user is interested in the program or disinterested. Likewise, facial expression analysis can be used to determine whether the user likes the program or dislikes the program. Information from the user interest detection module may be combined with the results from the user status module for provision of information to a social networking interface 28. In some embodiments, instantaneous video facial analysis of the user's likes and dislikes may be conveyed to social networking tools. A "social networking tool," as used herein, is an electronic communication technology, such as a website, that helps people interact with existing friends or colleagues and/or helps people discover new friends or colleagues by illuminating shared interests. Also, emails, tweets, text messages or other communications may be provided, as part of a social networking tool, to indicate the user's current activity and level of satisfaction.

In some embodiments video clips from the television program may be captured and conveyed to the processor 12 for distribution over the social networking interface 28 together with an indication of the user's viewing status and the user's current level of interest.

The storage 14 may store the captured video and may also store programs 30 and 50 for implementing embodiments of the present invention.

Figure 2:
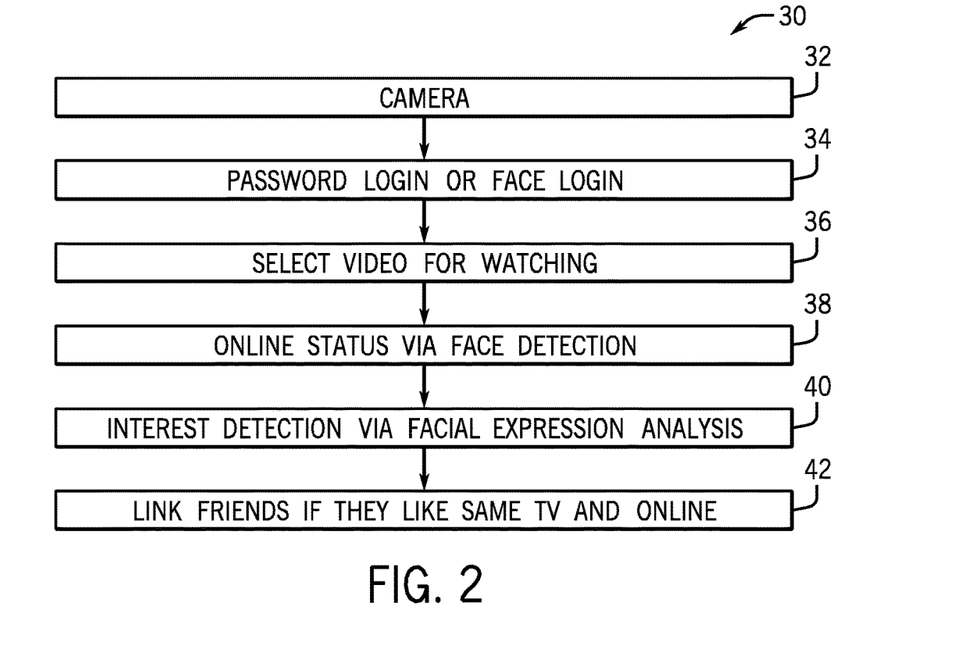
FIG. 2 is a flow chart for one embodiment of the present invention.
Figure 3:
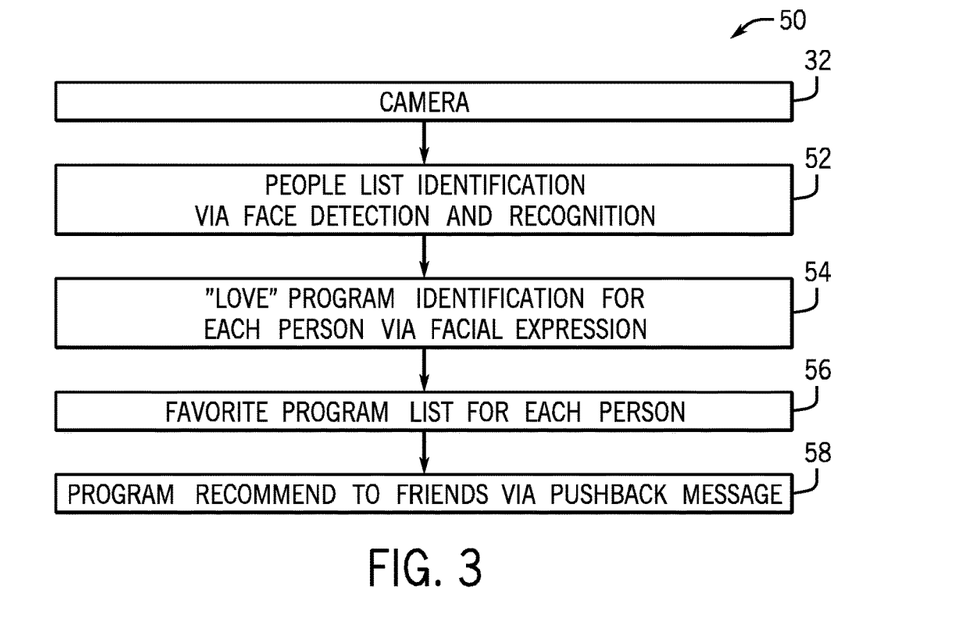
FIG. 3 is a flow chart for another embodiment of the present invention.

In particular in some embodiments of the present invention, the sequences depicted in FIGS. 2 and 3 may be implemented in hardware, software and/or firmware. In software or firmware implemented embodiments, the sequences may be implemented by computer executed instructions stored on a non-transitory storage medium such as a semiconductor, magnetic or optical storage device.

Referring to FIG. 2, one sequence may begin in one embodiment by receiving a feed (as indicated in block 32) from the camera 16, shown in FIG. 1. An initial phase (block 34) may involve a password login through a user interface or a face login wherein the user submits to video facial analysis using the camera 16 and the user status module 24. Once the user has identified himself or herself through a login and/or facial recognition, the user may select a video program for viewing as indicated in block 36. This program may be identified using a variety of tools including capturing information from an electronic programming guide, capturing video, audio or metadata clips and analyzing them using inputs from the user's friends over social networking tools or from Internet or database image or text searching or using any other tool. Then the user's online status may be determined through video face detection as indicated in block 38. Namely the user can be identified through analysis of the camera feed 16 to determine that the user not only is active on his or her processor based system 10 but is actually in front of and viewing an active television program.

Next the level of user interest may be determined using facial expression analysis as indicated in block 40. Well known video facial analysis techniques for determining whether the user is interested or disinterested or whether the user likes or dislikes a particular sequence in the video may be used. Thus information in real time may be provided to indicate whether the user's level of interest or disinterest or likes or dislikes have changed. This may be correlated to current content being viewed in terms of time, for example, while providing captured video clips from that content together with the indication of the user's level of interest.

The video facial analysis can be done locally or remotely. Remote video analysis may be accomplished by sending video to a remote server over a network connection, for example.

The information deduced from the facial expression analysis may then be conveyed to friends using social networking tools as indicated in block 42. In some embodiments, the social networking message distribution may be screened or filtered so only those users who are friends, friends who like the same television program, friends who are actually online, friends who are actually watching television or some combination of these categories as indicated in block 42. Friends can then be linked if they like the same television program, for example.

This social networking tool interaction provides a means for providing information about the user which may facilitate engagement with new friends and create resources for interaction with existing friends. In addition, the information may be used for demographics collection by content providers and advertisers. Particularly, content providers or advertisers may get very detailed information about what users liked at particular times during a given program or advertisement.

With one exemplary embodiment, six major steps may be used for facial attribute detection. First, the face detection may be run to locate a face rectangle region for a given digital image or video frame. Then, a facial landmark detector may be run to find six point landmarks, such as eye-corners and mouth corners, in each detected face rectangle. Next, the face rectangle image may be aligned and normalized according to facial landmark points to a predefined standard size, such as 64×64 (i.e., 64 pixels wide by 64 pixels tall). Then local features may be extracted, including local binary patterns, histograms, or histograms of oriented gradients from preselected local regions of the normalized face images. Each local region is then fed to a multi-layer perception based weak classifier for prediction. The output from the weak classifiers of each local region are aggregated as the final detection score. The score may be in the range of 0-1, the larger the score the higher the facial attribute detection confidence. Face detection may follow the standard Viola-Jones boosting cascade framework. The Viola-Jones detector can be found in the public OpenCV software package. The facial landmarks include six facial points, including eye-corners from the left and right eyes and mouth corners. The eye-corners and mouth corners may also be detected using Viola-Jones based classifiers. In addition, geometry constraints may be incorporated to six facial points to reflect their geometry relationship.

All detected faces may be converted to gray scale, aligned and normalized to the predefined standard size such as 64×64. The alignment may be done by first computing the rotation angle between the eye corner lines and the horizontal line. Then the image angle is rotated to make the eye corner parallel to the horizontal line. Next, two eye-center distances w are computed and eye-to-mouth distance h is computed. Then a 2w×2h rectangle is cropped from the face region to make the left eye-center at 0.5w,0.5h, right center 0.5w,0.5h, and mouth center at w,1.5h. The cropped rectangle is finally scaled to the standard size. To alleviate lighting differences between images, the scaling image can be histogram equalized.

Local features on local regions of aligned and normalized faces may be extracted. The local features can be local binary patterns, histogram, histogram of oriented gradients. For example, the extracted local features may be different for different facial attributes. For example, in smile detection, local binary patterns are a little better than other techniques while in gender/age detection, histogram of oriented gradient works slightly better.

The local region is defined as a quadruple (x,y,w,h), where (x,y) is a top left corner point of the local region and (w,h) is the width and height of the rectangle of the local region. A boosting algorithm may be used to select discriminating regions for facial attribute detection from a training dataset.

For each selected local region, a classifier may be trained to do the weak classification. The base classifier may be multi-layer perceptions rather than support vector machines. Multi-layer perceptions (MLP) may be advantageous in some embodiments because it can provide similar performance to state of the art support vector machine-based algorithms. Also, the model size of the MLP is much smaller than the support vector machines (SVM), since MLP only stores network weights as models while SVM stores sparse training samples. The prediction of MLP is relatively fast as it only contains vector product operations and MLP directly gives probability and score output but only for prediction confidence.

The MLP may include an input layer, an output layer and one hidden layer. Suppose there are d nodes at the input layer, where d is the dimension of the local features, 59 for local binary pattern histograms, 2 nodes at the output layer for smile detection and 2 nodes indicate prediction probability for smiling or non-smiling, while the number of nodes in the hidden layer is a tuned parameter and determined by a training procedure.

All nodes, known as neurons, in MLP may be similar. MLP may take the output values from several nodes in the previous layer on input and pass the responses to the neurons in the next layer. The values retrieved from the previous layer are summed with training weights for each node, plus a bias term, and the sum is transformed using an activation function $f$.

The activation function $f$ is usually a sigmoid function, such as $f(x)=e^{-xa}/(1+e^{-xa})$. The output of this function is in the range of 0 to 1. At each node, the computation is a vector product between a weight factor and input vector from the previous layer: $y=f(w \cdot x)$, where w is the weight factor and x is the input vector. Thus, the computations can be easily accelerated by single instruction, multiple data instructions (SIMD) or other accelerators.

MLP is used as a weak classifier for each local region. Each selected region associates with one MLP classifier. The final classification is based on a simple aggregating rule as follows. For a given test sample x, for each selected local region k, extract the local features $x_k$ at that region. Then use a weak MLP classifier $C_k(x_k)$ to do the prediction. The final output is the aggregated result $$\overline{C}(x) = \frac{1}{K} \sum_{n=1}^{K} C_n(x).$$

Referring next to FIG. 3, a camera feed is received at block 32. At block 52, a people list identification may be assembled using facial detection and recognition. In other words, all the people viewing the content (such as a television program) may be recorded using the camera 16. Then, video content analysis may be used to identify viewers who are watching and are depicted in that video stream. Again faces may be recorded with identifiers in a set up phase, in one embodiment.

Video expression analysis may then be used to determine which ones of the users viewing the program actually likes the given program at a given instance of time as indicated in block 54. Over time, favorite program lists for each video identified viewer may be developed as indicated in block 56. Then in block 58, program recommendations based on the user's computer detected facial expressions may be pushed to friends over social networking tools, including websites, tweets, text messages or emails, for example.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An entertainment-related system for use in association with a television, a camera, and an Internet-accessible source of streaming video, the source being to provide streaming video related to an interactive game playable via an Internet network, the streaming video to be displayed via the television, the entertainment-related system comprising:
a processor;
storage to store program instructions to be executed by the processor, the program instructions, when executed by the processor, resulting in the entertainment-related system being capable of performing operations comprising:
performing facial recognition-related processing, based upon (1) facial image information associated with facial image capture by the camera of multiple users presently in front of and viewing the television and (2) previously stored facial image data the multiple users comprising at least one of the multiple users at the television who is to be logged in to the entertainment-related system, the facial recognition-related processing to be used by the entertainment-related system for:
automatic user identification determination of the multiple users presently in front of and viewing the television; and
logging in to the entertainment-related system of at least one of the multiple users;
performing facial expression analysis based upon the facial image information, the facial expression analysis to be used to determine at least one facial expression of the at least one of the multiple users;
capturing, for social network distribution, video clip data comprising at least a portion of the streaming video that is currently being viewed by the at least one of the multiple users at the television; and
providing, via a social interaction networking tool, for the social network distribution, current viewing-related activity information of the at least one of the multiple users for use in facilitating social interaction via the tool, the current viewing-related activity information indicating (1) user viewing status of the at least one of the multiple users at the television and (2) satisfaction level of the at least one of the multiple users at the television the satisfaction level being capable of being based upon the at least one facial expression the video clip data to be provided for use in the social network distribution together with the current viewing-related activity information.

2. The entertainment-related system of claim 1, wherein:
the previously stored facial data is to be stored in the storage during set up of the entertainment-related system;
the camera is to be coupled to an interface of the entertainment-related system; and
the entertainment-related system is also to permit a password-based user login.

3. The entertainment-related system of claim 1, wherein:
the entertainment-related system is capable of providing, via the social network distribution, user like information, user dislike information, user interest information, and/or user disinterest information; and/or
the entertainment-related system further comprises the camera.

4. The entertainment-related system of claim 1, wherein:
the facial recognition-related processing and the facial expression analysis are performed, at least in part, by the entertainment-related system.

5. The entertainment-related system of claim 1, wherein:
the facial recognition-related processing and the facial expression analysis are performed, at least in part, by a remote server.

6. At least one non-transitory computer-readable medium storing instructions for execution by an entertainment-related system, the entertainment-related system being for use in association with a television, a camera, and an Internet-accessible source of streaming video, the source being to provide streaming video related to an interactive game playable via an Internet network, the streaming video to be displayed via the television, the instructions when executed by the entertainment-related system resulting in the entertainment-related system being capable of performing operations comprising:

performing facial recognition-related processing, based upon (1) facial image information associated with facial image capture by the camera of multiple users presently in front of and viewing the television and (2) previously stored facial image data the multiple users comprising at least one of the multiple users at the television who is to be logged in to the entertainment-related system, the facial recognition-related processing to be used by the entertainment-related system for:
automatic user identification determination of the multiple users presently in front of and viewing the television; and
logging in to the entertainment-related system of the at least one of the multiple users;
performing facial expression analysis based upon the facial image information, the facial expression analysis to be used to determine at least one facial expression of the at least one of the multiple users;
capturing, for social network distribution, video clip data comprising at least a portion of the streaming video that is currently being viewed by the at least one of the multiple users at the television; and
providing, via a social interaction networking tool, for the social network distribution, current viewing-related activity information of the at least one of the multiple users for use in facilitating social interaction via the tool, the current viewing-related activity information indicating (1) user viewing status of the at least one of the multiple users at the television and (2) satisfaction level of the at least one of the multiple users at the television the satisfaction level being capable of being based upon the at least one facial expression the video clip data to be provided for use in the social network distribution together with the current viewing-related activity information.

7. The at least one non-transitory computer-readable medium of claim 6, wherein:
the previously stored facial data is to be stored in storage of the entertainment-related system during set up of the entertainment-related system;
the camera is separate from the television and is to be coupled to an interface of the entertainment-related system; and
the entertainment-related system is also to permit a password-based user login.

8. The at least one non-transitory computer-readable medium of claim 6, wherein:
the entertainment-related system is capable of providing, via the social network distribution, user like information, user dislike information, user interest information, and/or user disinterest information; and/or
the entertainment-related system further comprises the camera.

9. The at least one non-transitory computer-readable medium of claim 6, wherein:
the facial recognition-related processing and the facial expression analysis are performed, at least in part, by the entertainment-related system.

10. The at least one non-transitory computer-readable medium of claim 6, wherein:

the facial recognition-related processing and the facial expression analysis are performed, at least in part, by a remote server.

11. A method implemented, at least in part, using an entertainment-related system, the entertainment-related system being for use in association with a television, a camera, and an Internet-accessible source of streaming video, the source being to provide streaming video related to an interactive game playable via an Internet network, the streaming video to be displayed via the television, the method comprising:

performing facial recognition-related processing, based upon (1) facial image information associated with facial image capture by the camera of multiple users presently in front of and viewing the television and (2) previously stored facial image data the multiple users comprising at least one of the multiple users at the television who is to be logged in to the entertainment-related system, the facial recognition-related processing to be used by the entertainment-related system for:
automatic user identification determination of the multiple users presently in front of and viewing the television; and
logging in to the entertainment-related system of at least one of the multiple users;
performing facial expression analysis based upon the facial image information, the facial expression analysis to be used to determine at least one facial expression of the at least one of the multiple users;
capturing, for social network distribution, video clip data comprising at least a portion of the streaming video that is currently being viewed by the at least one of the multiple users; and
providing, via a social interaction networking tool, for the social network distribution, current viewing-related activity information of the user present at the television for use in facilitating social interaction via the tool, the current viewing-related activity information indicating (1) user viewing status of the at least one of the multiple users at the television and (2) satisfaction level of the at least one of the multiple users at the television the satisfaction level being capable of being based upon the at least one facial expression, the video clip data to be provided for use in the social network distribution together with the current viewing-related activity information.

12. The method of claim 11, wherein:
the previously stored facial data is to be stored in storage of the entertainment-related system during set up of the entertainment-related system;
the camera is separate from the television and is to be coupled to an interface of the entertainment-related system; and
the entertainment-related system is also to permit a password-based user login.

13. The method of claim 11, wherein:
the entertainment-related system is capable of providing, via the social network distribution, user like information, user dislike information, user interest information, and/or user disinterest information; and/or
the entertainment-related system further comprises the camera.

14. The method of claim 11, wherein:
the facial recognition-related processing and the facial expression analysis are performed, at least in part, by the entertainment-related system.

15. The method of claim 11, wherein:
the facial recognition-related processing and the facial expression analysis are performed, at least in part, by a remote server.

16. An entertainment-related system for use in association with a television, a camera, and an Internet-accessible source of streaming video, the source being to provide streaming video related to an interactive game playable via an Internet network, the streaming video to be displayed via the television, the entertainment-related system comprising:
facial recognition-related processor to perform processing, based upon (1) facial image information associated with facial image capture by the camera of multiple users presently in front of and viewing the television and (2) previously stored facial image data the multiple users comprising at least one of the multiple users at the television who is to be logged in to the entertainment-related system, the facial recognition-related processing to be used by the entertainment-related system for:
automatic user identification determination of the multiple users presently in front of and viewing the television; and
logging in to the entertainment-related system of at least one of the multiple users;
the entertainment-related system being to perform facial expression analysis based, upon the facial image information, the facial expression analysis to be used to determine at least one facial expression of the at least one of the multiple users;
the entertainment-related system being to capture, for social network distribution, video clip data comprising at least a portion of the streaming video that is currently being viewed by the at least one of the multiple users at the television; and
the entertainment-related system being to provide, via a social interaction networking tool, for the social network distribution, current viewing-related activity information of the at least one of the multiple users for use in facilitating social interaction via the tool, the current viewing-related activity information indicating (1) user viewing status of the at least one of the multiple users at the television and (2) satisfaction level of the at least one of the multiple users at the television the satisfaction level being capable of being based upon the at least one facial expression, the video clip data to be provided for use in the social network distribution together with the current viewing-related activity information.

17. The entertainment-related system of claim 16, wherein:
the previously stored facial data is to be stored in storage of the entertainment-related system during set up of the entertainment-related system;
the camera is separate from the television and is to be coupled to an interface of the entertainment-related system; and/or
the entertainment-related system is also to permit a password-based user login.

18. The entertainment-related system of claim 16, wherein:
the entertainment-related system is capable of providing, via the social network distribution, user like information, user dislike information, user interest information, and/or user disinterest information; and/or
the entertainment-related system further comprises the camera.

19. The entertainment-related system of claim 16, wherein:
the facial recognition-related processing and the facial expression analysis are performed, at least in part, by the entertainment-related system.

20. The entertainment-related system of claim 16, wherein:
the facial recognition-related processing and the facial expression analysis are performed, at least in part, by a remote server.

21. An entertainment-related system for use in association with a television, a camera, and an Internet-accessible source of streaming video, the source being to provide streaming video related to an interactive game playable via an Internet network, the streaming video to be displayed via the television, the entertainment-related system comprising:
a processor;
storage to store program instructions to be executed by the processor, the program instructions, when executed by the processor, resulting in the entertainment-related system being capable of performing operations comprising:
performing facial recognition-related processing based upon (1) facial image information associated with facial image capture by the camera of multiple users presently in front of and viewing the television and (2) previously stored facial image data the multiple users comprising at least one of the multiple users at the television who is to be logged in to the entertainment-related system, the facial recognition-related processing to be used by the entertainment-related system for:
automatic user identification determination of the multiple users presently in front of and viewing the television; and
logging in to the entertainment-related system of at least one of the multiple users;
performing facial expression analysis based upon the facial image information, the facial expression analysis to be used to determine at least one facial expression of the at least one of the multiple users;
capturing, for social network distribution, video clip data comprising at least a portion of the streaming video that is currently being viewed by the at least one of the multiple users at the television; and
providing, via a social interaction networking tool, for the social network distribution, current viewing-related activity information of the at least one of the multiple users for use in facilitating social interaction via the tool, the current viewing-related activity information indicating (1) user viewing status of the at least one of the multiple users at the television and (2) satisfaction level of the at least one of the multiple users at the television the satisfaction level being capable of being based upon the at least one facial expression, the video clip data to be provided for use in the social network distribution together with the current viewing-related activity information;
wherein:
the camera is separate from the television.

22. The entertainment-related system of claim 21, wherein:
the previously stored facial data is to be stored in the storage during set up of the entertainment-related system;

the camera is to be coupled to an interface of the entertainment-related system; and the entertainment-related system is also to permit a password-based user login.

23. The entertainment-related system of claim 21, wherein:

the entertainment-related system is capable of providing, via the social network distribution, user like information, user dislike information, user interest information, and/or user disinterest information; and/or the entertainment-related system further comprises the camera.

24. The entertainment-related system of claim 21, wherein:

the facial recognition-related processing and the facial expression analysis are performed, at least in part, by the entertainment-related system.

25. The entertainment-related system of claim 21, wherein:

the facial recognition-related processing and the facial expression analysis are performed, at least in part, by a remote server.

\* \* \* \* \*